(12) United States Patent
Song et al.

(10) Patent No.: US 9,817,799 B2
(45) Date of Patent: Nov. 14, 2017

(54) METHOD AND APPARATUS FOR PROVIDING WEB PAGES

(75) Inventors: Jianping Song, Beijing (CN); Xiaojun Ma, Beijing (CN); Jun Xu, Beijing (CN); Renlei Chen, Beijing (CN); Yan Xu, Beijing (CN)

(73) Assignee: THOMSON LICENSING DTV, Issy-les-Moulineaux (FR)

( * ) Notice: Subject to any disclaimer, the term of this patent is extended or adjusted under 35 U.S.C. 154(b) by 0 days.

(21) Appl. No.: 14/369,705

(22) PCT Filed: Dec. 31, 2011

(86) PCT No.: PCT/CN2011/085188
§ 371 (c)(1),
(2), (4) Date: Jun. 29, 2014

(87) PCT Pub. No.: WO2013/097243
PCT Pub. Date: Apr. 7, 2013

(65) Prior Publication Data
US 2014/0372871 A1  Dec. 18, 2014

(51) Int. Cl.
*G06F 17/00* (2006.01)
*G06F 17/22* (2006.01)
(Continued)

(52) U.S. Cl.
CPC ........ *G06F 17/2247* (2013.01); *G06F 17/212* (2013.01); *G06F 17/30893* (2013.01); *G06F 17/30899* (2013.01); *H04L 67/22* (2013.01); *G06F 17/30867* (2013.01); *G06F 17/30902* (2013.01); *G06F 17/30905* (2013.01); *G06Q 30/02* (2013.01)

(58) Field of Classification Search
CPC ............ G06F 17/30893; G06F 17/212; G06F 17/2247; G06F 17/30902; G06F 17/30867; G06F 17/3089; G06F 17/30899; G06F 17/30905; G04L 67/22; G06Q 30/02; H04L 67/22
USPC .......................... 715/234, 789, 749, 811, 760
See application file for complete search history.

(56) References Cited

U.S. PATENT DOCUMENTS 5,717,923 A   2/1998 Dedrick
6,353,849 B1  3/2002 Linsk
(Continued)

FOREIGN PATENT DOCUMENTS

CN      1932871 A    3/2007
CN      101071426    11/2007
(Continued)

OTHER PUBLICATIONS

IBM Technical Disclosure, ("Method and Apparatus for Adaptively Loading Web Content Oriented by User Behavior at Client-side"—Published Jul. 7, 2009 pp. 0-7.*
(Continued)

*Primary Examiner* — Quoc A Tran (57) ABSTRACT

A method for providing a web page in a web server accessed by a user device, comprising: obtaining access behavior information to the web page by the user; and providing page contents and page layout adaptor of the web page to the user device so that a updated web page with an adapted page layout is generated by the user device according to the access behavior information.

7 Claims, 6 Drawing Sheets

(51) Int. Cl.
*G06F 17/21* (2006.01)
*H04L 29/08* (2006.01)
*G06F 17/30* (2006.01)
*G06Q 30/02* (2012.01)

(56) References Cited

U.S. PATENT DOCUMENTS

| | | |
|---|---|---|
| 6,615,247 B1 | 9/2003 | Murphy |
| 6,959,319 B1 | 10/2005 | Huang et al. |
| 6,976,210 B1 | 12/2005 | Silva et al. |
| 7,558,748 B2 | 7/2009 | Ehring et al. |
| 7,664,746 B2 | 2/2010 | Majumder |
| 7,698,173 B1 | 4/2010 | Burge et al. |
| 7,818,419 B1 | 10/2010 | McAllister et al. |
| 8,090,794 B1 | 1/2012 | Kilat et al. |
| 2002/0063735 A1 | 5/2002 | Tamir et al. |
| 2002/0158902 A1 | 10/2002 | Hooker et al. |
| 2004/0153972 A1 | 8/2004 | Jaepel et al. |
| 2004/0199584 A1 | 10/2004 | Kirshenbaum |
| 2005/0080667 A1 | 4/2005 | Knott et al. |
| 2005/0086330 A1 | 4/2005 | Perham et al. |
| 2005/0097008 A1 | 5/2005 | Ehring et al. |
| 2005/0228775 A1 | 10/2005 | Nilsen et al. |
| 2006/0195328 A1 | 8/2006 | Abraham et al. |
| 2006/0259469 A1 | 11/2006 | Chiu |
| 2008/0201206 A1* | 8/2008 | Pokorney .......... G06F 17/30867 705/7.29 |
| 2008/0208852 A1* | 8/2008 | Kuttikkad .............. G06Q 30/02 |
| 2008/0243631 A1 | 10/2008 | Kane et al. |
| 2009/0037355 A1 | 2/2009 | Brave et al. |
| 2009/0171754 A1 | 7/2009 | Kane et al. |
| 2011/0022945 A1* | 1/2011 | Yang ................ G06F 17/30899 715/234 |
| 2012/0090030 A1* | 4/2012 | Rapaport ............ H04L 63/1441 726/23 |

FOREIGN PATENT DOCUMENTS

| | | |
|---|---|---|
| CN | 10161791 A | 1/2010 |
| CN | 101621791 A | 1/2010 |
| CN | 102024028 | 4/2011 |
| DE | 10224715 | 12/2003 |
| DE | 10224716 | 12/2003 |
| EP | 0957437 | 11/1999 |
| EP | 1019858 | 7/2000 |
| EP | 1285363 | 2/2003 |
| EP | 1374081 | 1/2004 |
| JP | 2000293423 | 10/2000 |
| JP | 2002176593 | 6/2002 |
| JP | 2003006224 | 1/2003 |
| JP | 2006221604 | 8/2006 |
| JP | 2010015304 | 1/2010 |
| JP | 2010237949 | 10/2010 |
| JP | 2011150507 | 8/2011 |
| WO | WO0008583 | 2/2000 |
| WO | WO0045252 | 8/2000 |
| WO | WO0190952 | 11/2001 |
| WO | WO02077762 | 10/2002 |

OTHER PUBLICATIONS

IBM Technical Disclosure, ("Method and Apparatus for Adaptively Loading Web Content Oriented by User Behavior at Client-side"—Published Jul. 7, 2009 pp. 1-7.*

Search Report dated Oct. 4, 2012.

Anonymous: "Javascript";Internet Citation, http://en.wikipedia.org/w/index.php?title=JavaScript&oldid=95613905, May 17, 2010, pp. 1-6.

* cited by examiner

METHOD AND APPARATUS FOR PROVIDING WEB PAGES

This application claims the benefit, under 35 U.S.C. §365 of International Application PCT/CN2011/085188, filed Dec. 31, 2011, which was published in accordance with PCT Article 21(2) on Jul. 4, 2013 in English.

FIELD OF THE INVENTION

This invention relates to a method and apparatus for providing web pages from the web server to user devices according to behavioral information of the users.

BACKGROUND

Despite widespread usage of the Web and the constant growth of Web-based information services, user interactions with the Web generally lack humanizing touches generally. That is, most Web sites provide a diverse group of users with the same information in the same format. To increase the appeal and effectiveness of web site, it would be beneficial to provide a method for customizing the web pages to the individual end users. An increasing number of web sites offer personalized web pages displayed according to the user's preferences. For example, a news web site may allow users to customize the page layout so that sport news are displayed in page header for those who are most interested in sport news, while financial news are displayed in page header for those who prefer financial news.

In general, the personalized web pages are implemented by user's customization. The customization process is tedious and may require users to have special skills. As alternative solution, a method was provided to offer personalized web pages to individual end users without specific directions from the users. That is, the Internet system can monitor the actions taken by individual users in browsing web pages, and customize the web page including only the objects that have been used for a predetermined number of times for the subsequent visits.

However, the web server workload will be increased because of the customization for different users. Therefore, it is desirable to come up with an optimized solution that can offer personalized web pages to individual end users.

SUMMARY OF THE INVENTION

The present invention provides a system and method which offers personalized web pages to individual end users without specific directions from the users and without increasing the web servers' workload.

The invention concerns a method for providing a web page in a web server accessed by a user device, comprising: obtaining the user access behavior information to the web page; and providing page contents and page layout adaptor of the web page to the user device so that a updated web page with an adapted page layout is generated by the user device according to the access behavior information.

The invention also concerns a method for providing a web page layout adapted to a user, comprising: obtaining the user's access behavior information, providing page content of the web page together with a layout adaptor to a user device of the user, and generating by the user device an adapted web page layout according to the access behavior information.

The invention also concerns a web server for providing a web page accessed by a user using the above method.

The invention also concerns a method used in a user device for providing a web page from a web server to a user, comprising: receiving page contents of the web page, together with the user's access behavior information and a page layout adaptor from the web server; generating a updated layout of the web page with the received page layout adaptor and the access behavior information of the user; and providing the updated web page with the adapted page layout to the user.

The invention also concerns a method used in a user device for providing a web page from a web server to a user, comprising: identifying the user to the user device; storing the user's access behavior information; receiving page contents of the web page, together with a layout adaptor from the web server; generating a updated layout of the web page with the received layout adaptor and the stored user's access behavior information; and providing the updated web page with the adapted page layout to the user.

The invention also concerns a user device for providing a web page from a web server to a user using above the method.

BRIEF DESCRIPTION OF THE DRAWINGS

These and other aspects, features and advantages of the present invention will become apparent from the following description of an embodiment in connection with the accompanying drawings.

DETAILED DESCRIPTION OF THE INVENTION

In the following detailed description numerous specific details are set forth in order to provide a thorough understanding of the present invention. However, it will be understood by those skilled in the art that the present invention may be practiced without these specific details.

Figure 1:
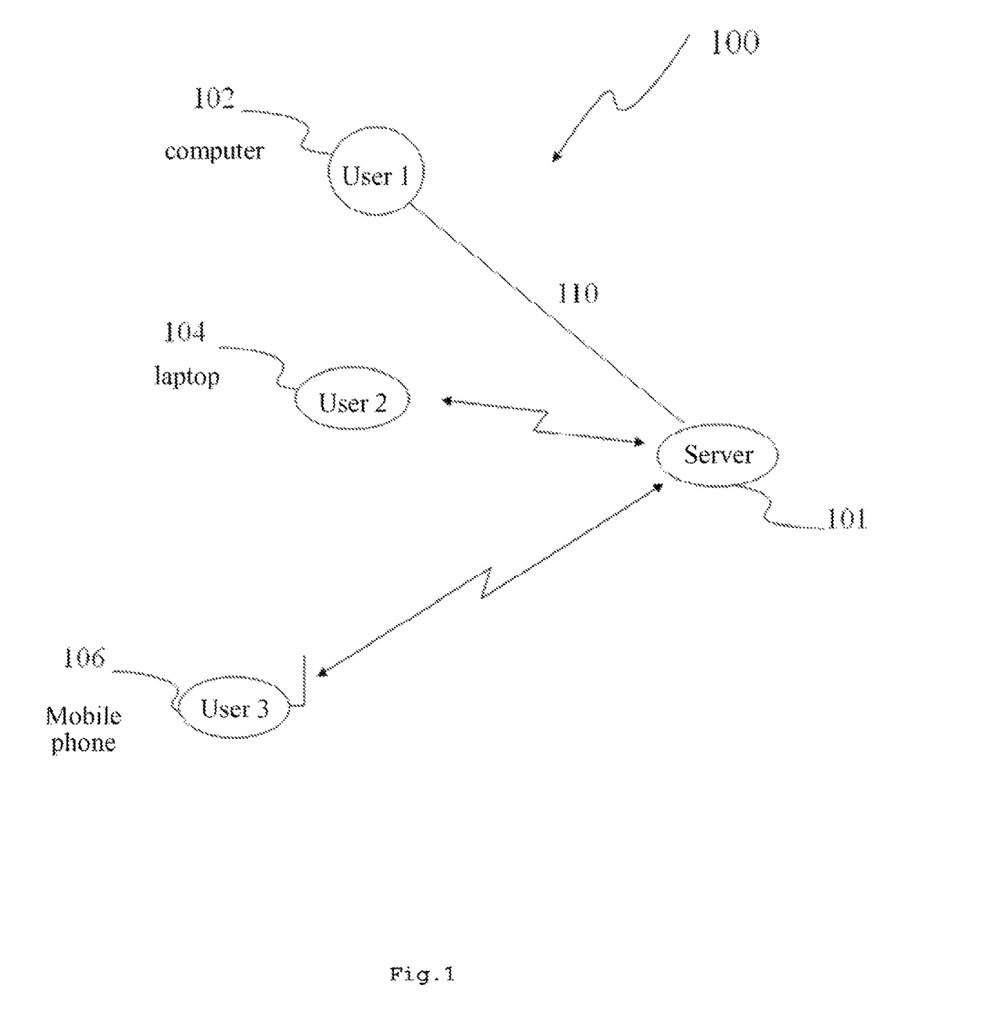
FIG. 1 is a schematic diagram illustrating an Internet system for serving web pages to users, wherein an embodiment of the invention is used.

FIG. 1 is a schematic diagram illustrating an Internet system 100 for serving web pages to users. In FIG. 1, the system 100 includes user devices 102, 104 and 106 communicatively linked to a web server 101 via network 110. The user devices can be any computing device such as computer, laptop, and mobile phone, upon which a browser (not shown) is disposed, and the browser is capable of receiving web pages from the web server 101 and rendering the web pages to users of the user devices. It is known to one skilled in the art that the number of user devices is not limited as shown in the figure, but can be arranged as required.

Generally a user visits a web service by typing in the Universal Resource Locator (URL) of the site on the browser and the home page of the website is launched for display on the user device. Upon arriving at the home page, the user performs his or her typical operations. These include clicking on some major links on the site, entering text into a search box, checking a set of checkboxes, etc.

Figure 2:
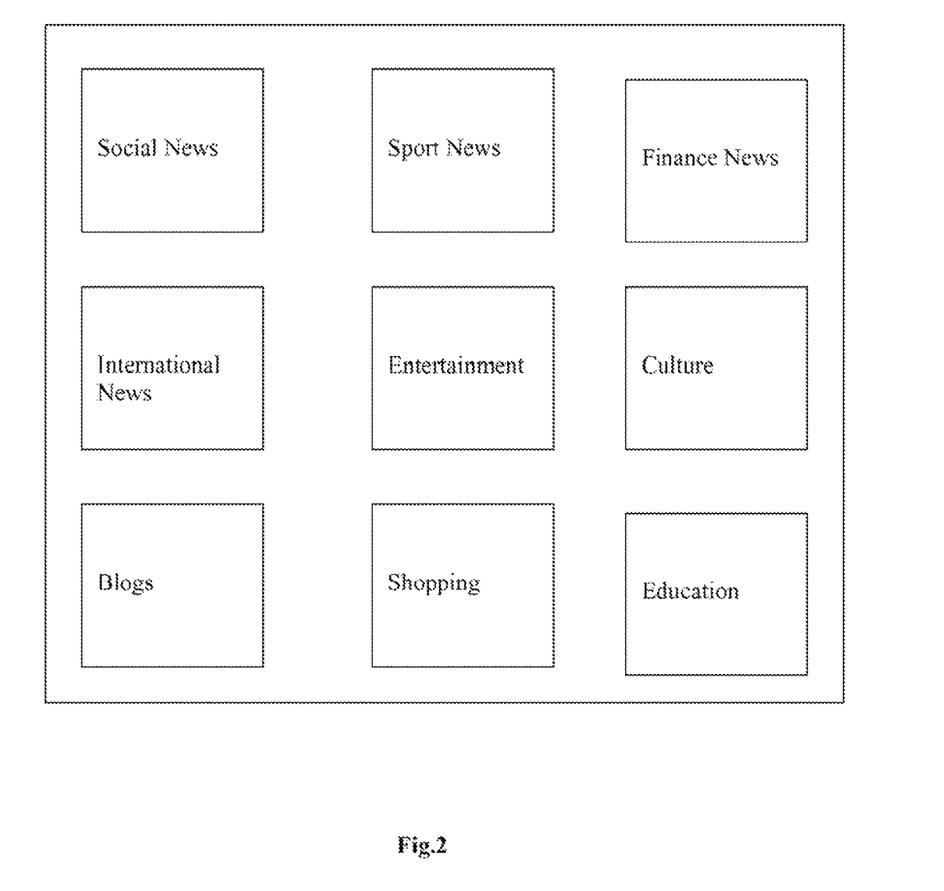
FIG. 2 is a block diagram illustrating an exemplary screen window of a web page according to the embodiment of the invention.

In conventional web pages, the location of each fragment of a web page is fixed and defined by web server during the page layout process, and the fixed and defined web page is shown to all users. In accordance with the embodiment of the invention, the location of each fragment is adapted with user's access behavior information from the access history. For example, FIG. 2 shows a web page for a user who has preference for the social news, sport news and finance news. So these fragments are displayed in the conspicuous location in the adapted layout of the web page, e.g. the top of the page, and other information or fragments of the adapted layout are shown in other locations of the web page, or hidden or deleted from the web page while remaining an indication for these fragments. For another user who has preference for the culture, entertainment and shopping, when he or she accesses the same web site, he or she will find that the information of culture, entertainment and shopping is displayed in the conspicuous position.

In another embodiment of the invention, each fragment of a web page can be further divided into several sub-fragments so that the page layout of each fragment can be adapted and the preferred sub-fragments are displayed in the conspicuous position within the fragment area. Here, page layout is the technology of graphic design that deals in the arrangement and style treatment of elements (content) on a page.

Here a preferred fragment or sub-fragment of the web page is defined as the fragment or sub-fragment for which the user has accessed more times than other fragments or sub-fragments or the access number exceeds a predetermined threshold, or the user has specified in advance. It is known to one skilled in the art that the preferred fragment or sub-fragment, and the number of preferred fragments or sub-fragments can be defined as required. In another embodiment, the web page displayed to the user only includes the preferred fragments or sub-fragments.

The conspicuous position in the adapted layout of the web page can be the top of the web page, the center of the web page and so on. In addition, the conspicuous position can be varied according to different display device, for example, it is the top of the web page for the computer display and is the center of the web page for the mobile phone.

The access behavior information can be obtained by the web server 101 according to user's input or access history of the user to the web page, or to all web pages of the web server. For many of the current web sites provided by the web server 101, a user usually establishes an account on the web server 101, which usually consists of a user name and a password. After a user logins into the web server 101 with his account, the web server 101 can identify the user by his account and get his profile data or access behavior information from the user profile database. Here, the access behavior information is obtained according to the user's previous browsing behavior. According to another embodiment, the user access behavior information can be provided by the user.

The following is a list showing the user access behavior information when browsing one web page or all web pages of the web server according to an embodiment:

| User 1 access behavior information | | | | |
|---|---|---|---|---|
| User | fragment | Click Number | Preferred | Priority |
| User 1 | Social news | 126 | No | 2 |
| User 1 | Sport news | 483 | Yes | 1 |
| User 1 | Football | 419 | Yes | 1 |
| User 1 | Basketball | 21 | No | 3 |
| User 1 | Other | 43 | No | 3 |
| User 1 | Finance News | 24 | No | 3 |
| User 1 | International News | 56 | No | 3 |
| User 1 | Entertainment | 381 | No | 2 |
| User 1 | Culture | 37 | No | 3 |
| User 1 | Blogs | 398 | Yes | 1 |
| User 1 | Shopping | 45 | No | 3 |
| User 1 | Education | 67 | No | 2 |

In this list, the access behavior information for user 1 is shown. According to the embodiment, if the top of the web page is the conspicuous position, in the fragments of the adapted layout, sport news, football, and blogs can be shown on the top, and all other information are shown under these preferred fragments. In another embodiment, the fragments of the adapted layout are shown based on their priority, for example, the fragments with priority 1 are shown in the top of the web page, the fragments with priority 2 is under the priority 1, and the fragments with priority 3 is under the priority 2. The list just shows the access behavior information for one web page, and the access behavior information of user 1 can be gotten for different web page. In addition, access behavior information can be saved on the web server or the user device based on different implementation. If the access behaviour information is saved on the user device, the access behaviour information can be the access history to one or more web servers.

Figure 3:
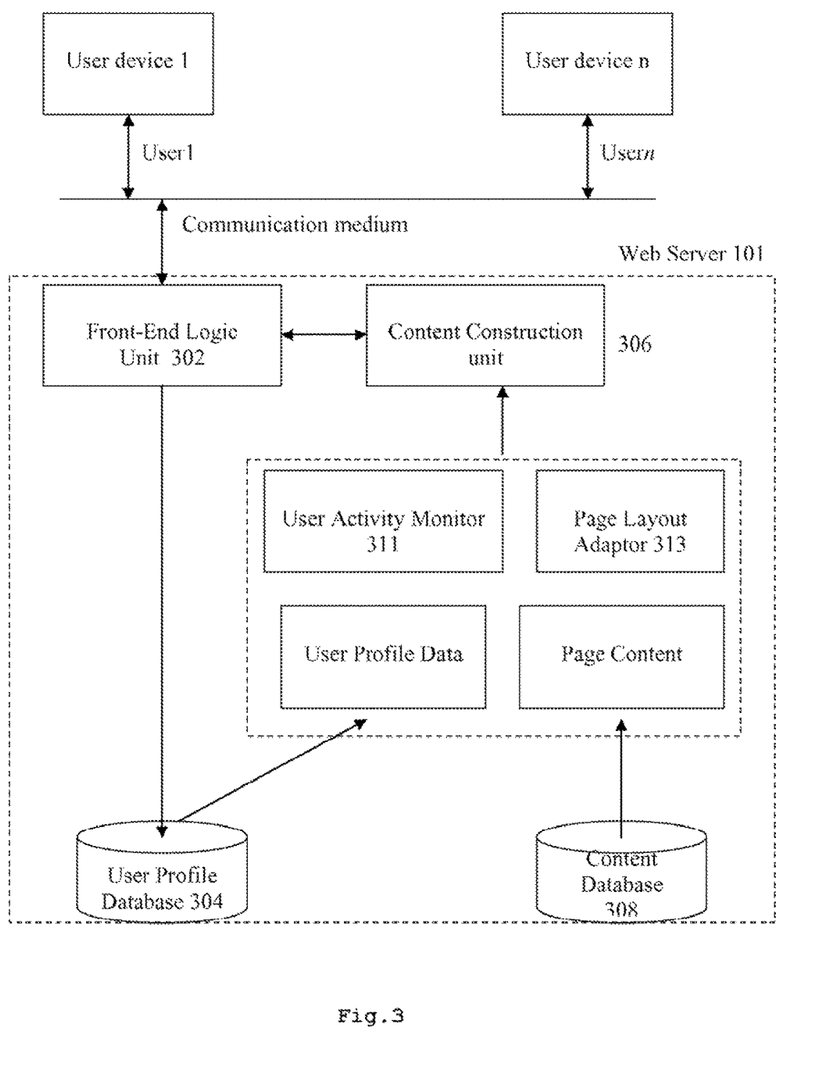
FIG. 3 is a block diagram showing the architecture of a web server in the Internet according to an embodiment of the invention.

FIG. 3 is a block diagram showing the architecture of a web server 101 in the Internet system 100 according to an embodiment of the invention for providing the personalized web pages to individual users. The user devices 1 to n are connected to the web server 101 via a communication medium, such as the communication network 110. In the embodiment, the communication medium is the Internet. However, it is not to be construed as limiting, but can also be wireless medium or any medium for transmitting information. In addition, the information presented to the users can be in the form of HTML pages or files, but it can be any information format known to one skilled in the art or created in the future.

Considering the web server 101 in detail, front-end logic unit 302 is responsible for interfacing with user devices through the communication medium by responding user's HTTP request and returning the requested content in the form of HTML pages according to the HTTP protocol. For example, the user's browser may send a HTTP GET request for a web page by providing the URL of the web page. The front-end logic unit 302 will analyze the request, call related functions such as content construction to build the requested web page and then return the requested web page to user's browser. In another example, the user's browser may send a HTTP POST request to update some data (e.g., the user profile data) of the web server. The front-end logic unit 302 will analyze the request and then call related functions to update the data.

A content construction unit 306 as shown in FIG. 3 provides construction of the HTML pages. The content construction unit 306 will retrieve the page content (usually in HTML format) from the content database 308, the page layout adaptor script of the web page (usually in JavaScript format), the user activity monitor script (usually in JavaScript format), the user access behavior information from the user profile database 304, and other content such as the advertisement. Then all these contents are packaged into a HTML file. According to the embodiment, the page layout of the page content is not adapted until the user's browser runs the layout adaptor script included in the HTML file according to the access behavior information. Therefore, in the integrated HTML page, the page content, the layout adaption logic, and the user activity monitor logic are same for all users if they request the same web page. However, the user profile data is different for different user. The layout of the page content is determined by user browser according to the user profile data. The web server 101 does not need to run the page layout for different users.

A user activity monitor 311 is responsible for the monitor of user's behavior after it is sent to the user device together with the page contents. During the browsing of the page content, the user activity monitor 311 will monitor the user's browsing behavior and deduce the user's preference. User activity monitor 311 is a package of scripts embedded in the web page. It will record the user's behavior and generate the user access behavior information. For example, when user clicks on an item, the script of the user activity monitor 311 will be run by the browser in user device. Then the user activity monitor 311 may increase the number of clicks for that item. According to the embodiment, the content construction unit 302 will attach the script of user activity monitor 311 to each item of the web page that will be monitored. In addition, the user activity monitor 311 can monitor the browsing time the user spends in each page fragment, and use it as the metric of the preference of each fragment as shown in FIG. 2.

In one embodiment, the behavior information of the user is measured for days or times that the user visited each fragment of the web page. A threshold may be determined for each fragment, and the threshold may be different for different fragment. If the number of visits is determined to exceed a threshold or if the user has manually registered the user's preferences to the system, the next time the user visits the site, the user obtains a version of the site that has been customized to the user's previous visits.

A layout adaptor 313 is responsible for adapting the layout of the page content by the user's profile data. The browser of the user device will run the layout adaptor script once the web page is loaded. The layout adaptor script defines an area in the web page to be adapted, reads the user access behavior information, and then set the position of each fragment in the area of the web page according to the user access behavior information. According to the embodiment, the layout adaptor sorts the page fragments based on the number of visits or priority that is recorded in the user access behavior information, then selects the first page fragment from the sorted list and set its position to the most conspicuous available position. The layout adaptor selects the next page fragment from the sorted list and set its position to the next most conspicuous available position. The layout adaptor continues the process until all page fragments' position is determined. The browser will display all page fragments according to the position determined by adaptor layout.

The user profile database 304 is a storage medium or device, and is used to keep all users' profile data and access behavior information. These data is critical in providing personalized web pages. Another storage device is the content database 308, which is used to hold the content of all web pages. The storage device for user access behavior information and web page contents may be implemented as a single database or two separate databases.

Figure 4:
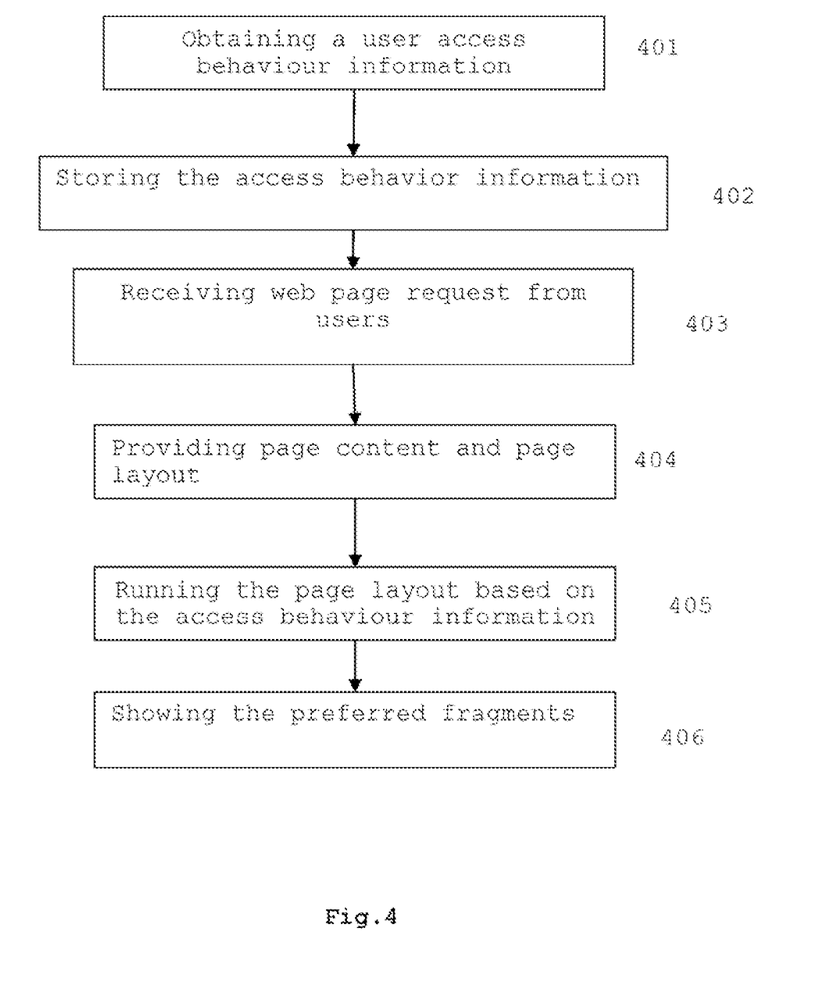
FIG. 4 is a flow chart showing the web page customizing method in the web server and user device according to the embodiment of the invention.

FIG. 4 is a flow chart showing the web page customizing method in the web server and user device according to the embodiment of the invention. At step 401, the user access behavior information to the web page is obtained by the user activity monitor 311 according to access history of the users. Then at step 402, the access behavior information is stored in the web server or the user device. It is preferred that user establishes an account with the web server and the user profile data and access behavior information is saved at web server so that the user can have the consistent personalized web page when the user accesses the web server through different client systems.

In another embodiment, if the access behavior information is saved in the user device, the packaged HTML file of the web page from the web server 101 includes page content (usually in HTML format) from the content database 308, the page layout adaptor script of the web page (usually in JavaScript format), the user activity monitor script (usually in JavaScript format). The web page will be adapted by the page layout adaptor in the user device with the local access behavior information. In addition, the local access behaviour information is saved in the user device as a cookie of the browser, which records the user access behavior information related to the user ID in the operation system such as windows. Therefore, the user can be identified by the user ID so as to enjoy the personalized web pages regardless of whether the user logins into different web server. If the cookie of the browser records the user access behavior information, which is not related to the user ID, anyone who uses the user device has the same personalized web page.

At step 403, the web page request is received by the web server from the user device, and then at step 404, the page contents and page layout of the web page are provided to the user device so that an adapted page layout of the web page is generated by the user device according to the access behavior information. Here, if the access behavior information is stored in the web server, the access behavior information will be provided together with the page contents and page layout.

At step 405, the page layout is run in the user device, and the updated web page with the adapted layout is generated based on the access behavior information. Then at step 406, the preferred fragments are shown in the conspicuous location of the updated web page, or only the preferred fragments are shown in the web page. According to the embodiment, the conspicuous location of the adapted layout can be the top of the web page for a computer or central part of a mobile phone.

In the prior art, the customized web page layout is done in the Internet server and the web page information is different to different users, so the workload of the server is huge, and the coordination of several servers in the Internet system is difficult. According to the invention, the adaption of page layout is implemented by client browsers so that it can reduce the amount of time required by web server to construct or generate a particular web page for a user.

Figure 5:
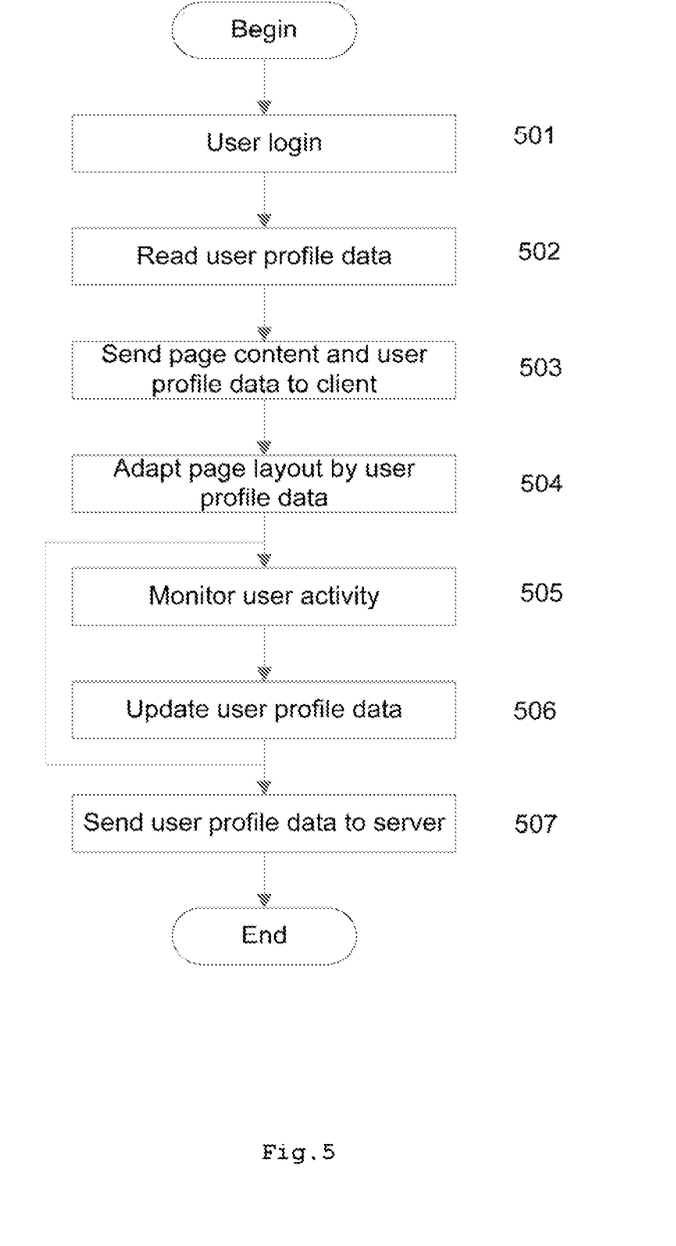
FIG. 5 is a flow chart showing the overall operation during the browsing of a web page according to an embodiment of the invention.

FIG. 5 is a flow chart showing the overall operation during the browsing of a web page according to an embodiment of the invention. In the embodiment, user's access behavior information is stored in the web server. When the browsing of the web page is started, the user logins at step 501 so that the user's entity is identified by the web server, and of course the web server can have other way to identify the user. Then at step 502, the user profile data or access behavior information is read from its memory, and sent to user together with the page content at step 503. At the same time, the user activity monitor and the page layout adaptor script of the web page are also sent to the user. Then at step 504, the page layout of the web page is adapted by the user profile data at the user device. At step 505, the user browsing activity for the web page is monitored, and the user profile date or access behavior information is updated at step 506. The updated user access behavior information is sent to the web server after finishing the browsing at step 507.

Figure 6:
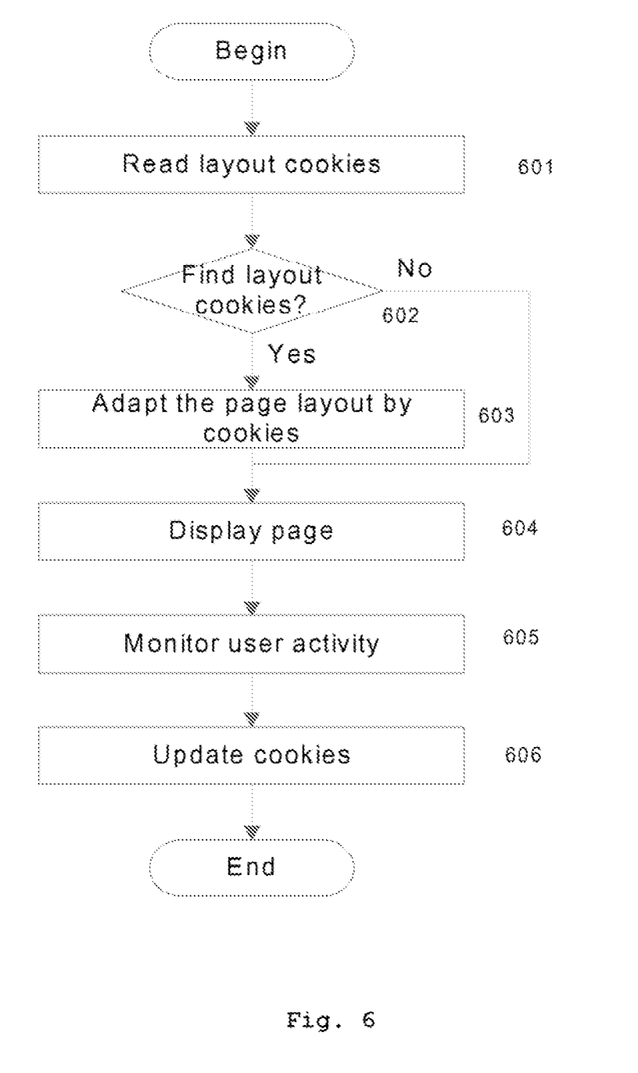
FIG. 6 is a flow chart showing the overall operation during the browsing of a web page according to another embodiment of the invention.

FIG. 6 is a flow chart showing the overall operation during the browsing of a web page according to another embodiment of the invention. In the embodiment, user's access behavior information is stored in the user device as cookies. When the browsing of the web page is started, the browser prepares to read layout cookies at step 601. Then at step 602, determine whether the layout cookies are found or not, then if the answer is yes, go to step 603, the page layout of the web page is adapted by the cookies including user profile data or access behavior information, and the web page is displayed at step 604. If the answer is no, the web page is displayed with out page layout adaption at step 604. At step 605, the user browsing activity for the web page is monitored, and the user profile date or access behavior information is obtained so as to update the cookies at step 606.

In one advantageous embodiment, the user profile data is saved either at web server or client system, depending on whether the user logins into the web server. Here, the user login is not the only way to identify the user, and the user can be identified by any other known or the future technology.

In one embodiment, web server provides a friendly user interface so that a user can customize his web page by direct commands. That is, the user profile data and access behavior information can be modified directly by the end user. The customized web page is then adapted automatically by monitoring user's activity. This can quicken the adaption of page layout for users.

The foregoing merely illustrates the embodiment of the invention and it will thus be appreciated that those skilled in the art will be able to devise numerous alternative arrangements which, although not explicitly described herein, embody the principles of the invention and are within its spirit and scope.

The invention claimed is:

1. A method comprising
   receiving, by a user device, page content of a web page, behavior information associated with a user of the user device, a page layout adaptor script and a user activity monitor script from a web server, wherein the user device is where the web page is launched for display on the user device;
   customizing, by executing the page layout adaptor script in the user device, the page content of the web page in accordance with the behavior information,
   monitoring, by the user device, browsing activities on the web page by using the user activity monitor script;
   updating, by the user device, the behavior information based on the monitored browsing activities;
   sending, by the user device, the updated behavior information to the web server; and
   wherein the behavior information of user is based on number of user visits measured for one or more fragments of webpages visited by the user and the behavior information of the user is measured for days or times, and
   wherein the customizing further comprising adapting a layout of the page content based on whether or not the measured number of the user visits exceeding a value.

2. The method of claim 1, wherein the customizing comprises displaying, by the user device, a preferred fragment of the web page in a conspicuous location of the page layout.

3. The method of claim 2, wherein the conspicuous location of the page layout corresponds to a top portion of a computer display or television screen or to a central portion of a mobile phone display.

4. Non-transitory computer-readable medium with instructions stored therein which upon execution cause at least one processor to:
   receive by a user device, page content of a web page, behavior information associated with a user of the user device, a page layout adaptor script and a user activity monitor script from a web server, wherein the user device is where the web page is launched for display on the user device;
   customize, using the page layout adaptor script, the page content of the web page in accordance with the access behavior information;
   monitor browsing activities on the web page by using the user activity monitor script;
   update the access behavior information based on the monitored browsing activities; and
   send the updated access behavior information to the web server; and
   wherein the behavior information of user is based on number of user visits measured for one or more fragments of webpages visited by the user and the behavior information of user is measured for days or times, and
   wherein, to customize the page content, the at least one processor is further caused to adapt a layout of the page content based on whether or not the measured number of the user visits exceeding a value.

5. A user device comprising:
   a memory;
   at least one processor coupled to the memory, wherein the at least one processor is configured to:
   receive by the user device page content of a web page, behavior information associated with a user of the user device, a page layout adaptor script and a user activity monitor script from a web server, wherein the user device is where the web page is launched for display on the user device;
   customize, using the page layout adaptor script, the page content of the web page in accordance with the behavior information;
   monitor browsing activities on the web page by using the user activity monitor script;
   update the behavior information based on the monitored browsing activities;
   send the updated behavior information to the web server; and
   wherein the behavior information of user is based on number of user visits measured for one or more fragments of webpages visited by the user and the behavior information of user is measured for days or times, and
   wherein, to customize the page content, the at least one processor is further configured to adapt a layout of the page content based on whether or not the measured number of the user visits exceeding a value.

6. The user device according to claim 5, wherein, to customize the page content, the at least one processor is configured to display a preferred fragment of the web page in a conspicuous location of the page layout.

7. The user device of claim 6, wherein the conspicuous location of the page layout corresponds to a top portion of a computer display or television screen or to a central portion of a mobile phone display.

\* \* \* \* \*